United States Patent

[11] 3,604,330

[72] Inventors Paul Fahlenberg
Baierbrunn;
Walter Ruppelt, Munich, both of, Germany
[21] Appl. No. 757,362
[22] Filed Sept. 4, 1968
[45] Patented Sept. 14, 1971
[73] Assignee Compur-Werk Gesellschaft mit beschrankter Haftung & Co.
Munich, Germany
[32] Priority Sept. 19, 1967
[33] Germany
[31] P 15 97 154.7

[54] MAGNETICALLY DRIVEN PHOTOGRAPHIC SHUTTER WITH BRAKING
5 Claims, 2 Drawing Figs.

[52] U.S. Cl. .................................................... 95/53 E
[51] Int. Cl. .................................................... G03b 9/62
[50] Field of Search .......................................... 95/12, 5,
31, 53, 58, 59, 62, 63

[56] References Cited
UNITED STATES PATENTS

| | | | |
|---|---|---|---|
| 2,919,324 | 12/1959 | Schuessler.................. | 355/179 X |
| 3,444,794 | 5/1969 | Wasielewski et al.......... | 95/10 |
| 3,466,993 | 9/1969 | Fahlenberg et al. .......... | 95/53 X |
| 3,471,226 | 10/1969 | Wasielewski et al.......... | 95/10 X |

Primary Examiner—Samuel S. Matthews
Assistant Examiner—M. L. Gellner
Attorney—Larson and Taylor

ABSTRACT: A photographic camera shutter arrangement includes first and second magnetic windings which respectively control the opening and closing movements of the shutter blades. The windings are pulse-energized, the interval between the energization of the first winding by a first control pulse and of the second winding by a second control pulse determining the exposure time of the shutter. A braking pulse applied after a control pulse is applied to a winding other than that to which the control pulse is applied retards movement of the shutter blades in the direction dictated by the control pulse so that "bouncing" or rebounding of the shutter blades is reduced.

INVENTORS
PAUL FAHLENBERG
WALTER RUPPELT

3,604,330

MAGNETICALLY DRIVEN PHOTOGRAPHIC SHUTTER WITH BRAKING

BACKGROUND OF THE INVENTION

1. Field of the Invention

The present invention relates to photographic cameras and more particularly to pulse-controlled magnetically driven camera shutter arrangements.

2. The Prior Art

In accordance with a conventional form of photographic camera the shutter ring of a common shutter arrangement is controlled through movement of the armature of an electronically operated magnetic control device. In cameras of this type first and second timing pulses respectively control the opening and closing movement of the shutter blades, the time interval between the pulses determining the exposure time provided by the shutter arrangement. Systems of this type generally require the use of powerful control or driving pulses for the magnetic control device in order to guarantee that even exposure times of very short durations can be achieved. The use of such powerful control pulses produces a number of problems one of the most vexing of which is that of the exaggerated "bounce" or rebounding of the shutter mechanism resulting therefrom. This rebounding results in stresses and strains in the elements forming the shutter arrangement particularly after prolonged periods of use and may cause actual deformation or other damage to the shutter elements. These problems have lead to experimentation with other forms of shutter arrangements wherein shutter "bounce" is less of a factor.

SUMMARY OF THE INVENTION

In accordance with the present invention means are provided for reducing rebounding of the shutter elements in a pulse-controlled magnetic shutter arrangement.

In accordance with the invention a braking pulse is applied to the magnetic drive for the shutter blades as the blades are moving toward the end positions thereof (during either an opening or closing movement) to provide a force on the shutter blades which acts in a sense opposite to the movement of the blades and thereby retards this movement. To explain, considering the operation of a specific embodiment of the invention, a control pulse is applied to a first magnetic winding which may control either opening or closing of the shutter blades. Unless acted upon by an outside force the impetus given to the movable elements in the shutter arrangement by the control impulses and the momentum acquired by these elements during their travel will cause a relatively heavy impact between these elements and whatever stop is provided therefor with resultant rebounding of the elements and the associated deleterious effects thereof. By applying a braking force which acts on the shutter elements during the travel thereof in a sense opposite to the direction of travel a retarding effect on these elements is produced and the impact with which these elements strike the stops therefor is reduced.

The invention is preferably incorporated into a system of the type described above wherein first and second control pulses respectively control the opening and closing movements of the shutter arrangement. The magnetic control device for the shutter arrangement preferably comprises a first magnetic winding for controlling opening movement of the shutter arrangement and a second magnetic winding for controlling the closing movement of the shutter arrangement. In this embodiment when, for example, an opening control pulse is applied to the first winding, a braking control pulse is applied to the second winding during the opening movement of the shutter arrangement to provide the retarding effect discussed above. In accordance with a further feature of the present invention the braking pulse is of significantly shorter duration than the control pulse such that the opening (or closing) movement of the shutter arrangement is merely retarded but not reversed. In accordance with this preferred embodiment of the invention electronic means are provided for automatically applying a braking pulse to one of the windings where the other winding is energized by a control pulse to retard the movement of the shutter elements in the direction dictated by the control pulse.

DESCRIPTION OF THE PREFERRED EMBODIMENTS

Figure 1:
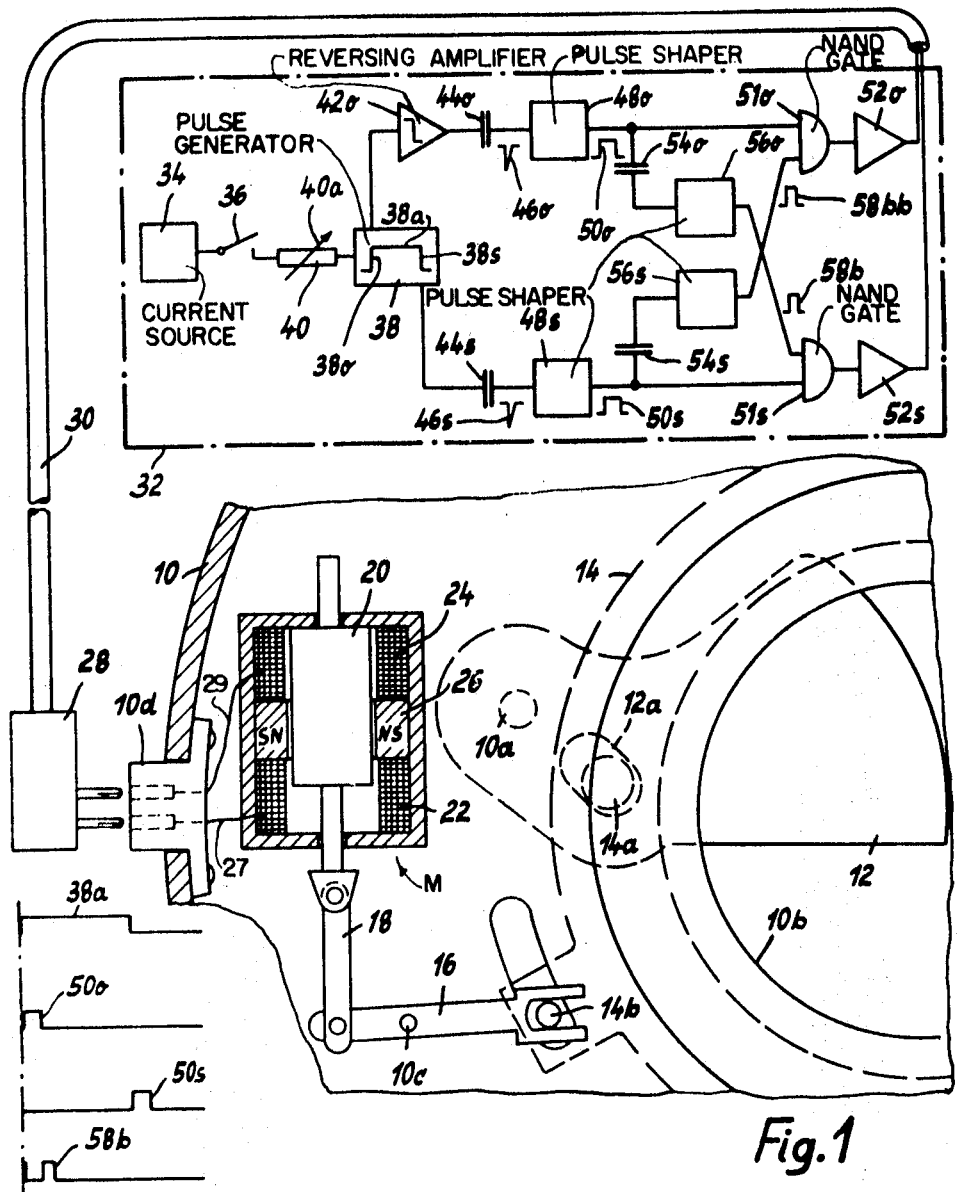
FIG. 1 is a schematic diagram, partially in section, of a presently preferred embodiment of the invention showing a magnetically operated shutter arrangement and the electronic control circuit therefor.

Referring to FIG. 1, a portion of a photographic camera includes a number of shutter blades mounted within the shutter housing generally denoted 10 (only one shutter blade 12 actually being shown in FIG. 1 for purposes of clarity). Shutter blade 12 is pivotably mounted by a pivot pin 10a and includes a control slot 12a therein which is adapted to receive a control pin 14a mounted on a shutter drive ring 14. Drive ring 14 is mounted for rotation about the objective aperture 10b of the shutter housing and includes a drive pin 14b mounted on an outwardly extending portion thereof. Pine 14b is received in a slot in one end of a double-armed drive lever 16 which pivots about a pivot pin 10c fixed to the shutter housing 10. The other end of lever 16 is pivotably secured to a linkage 18 which is connected through suitable connecting means to armature 20 of an electromagnetic control device generally denoted M.

Control device M includes first and second magnetic windings 22 and 24 which are separated from one another by an intermediate permanent magnet 26 of generally annular construction. Permanent magnet 26 amplifies the effectiveness of magnetic windings 22, 24 and acts to maintain armature 20 in the end position thereof as is described hereinbelow. Reference may be made to commonly assigned copending U.S. Pat. No. 3,466,993 for further details of the operation of the electromagnetic control device. The magnetic control device is mounted within the shutter housing 10 as shown and is connected through first and second conductors 27 and 29 to a contact socket 10d which extends outwardly of shutter housing 10. Contact socket 10d is adapted to receive the contact pins of a contact plug 28. Contact plug 28 is connected through a cable 30 to an electronic control device generally denoted 32 which provides controlled timing pulses for actuating electromagnetic control device M.

Included within the housing for control device 32 is a voltage source 34 which may conveniently be a battery. A switch 36, in the closed position thereof, connects source 34 with a control pulse generator 38 which produces a rectangular electrical control pulse as indicated by pulse 38a. A variable resistor 40 included in the series connection between current source 34 and pulse generator 38 provides means for varying the duration of the control pulse 38a produced by pulse generator 38. A manual setting member 40a is provided for varying the value of resistor 40.

One output of pulse generator 38 is fed through a reversing amplifier 42o and a differentiating capacitor 44o to a pulse shaper 48o. The leading edge 38o of control pulse 38a is converted by amplifier 42o and capacitor 44o into a negative needle pulse or spike 46o. Negative spike 46o is converted by pulse shaper 48o into a rectangular pulse of a predetermined duration. The pulse so produced is indicated at 50o on FIGS. 1 and 2. The trailing edge 38s of control pulse 38a is converted by a differentiating capacitor 44s into a negative spike 46s similar to spike 46o. Spike 46s is similarly converted by a pulse shaper 48s into a rectangular pulse indicated at 50s in FIGS. 1 and 2. As indicated in FIG. 2 pulse 50s is delayed as compared with pulse 50o.

The output of pulse shaper 48o is directly connected to one input of the first NAND gate 51o and through a differentiating capacitor 54o and a further pulse shaper 56o to a first input of a second NAND gate 51s. Similarly the output of pulse shaper 48s is connected directly to the second input of second NAND gate 51s and through differentiating capacitor 54s and a further pulse shaper 56s to the second input of first NAND gate 51o.

With this arrangement the output of pulse shaper 48o, namely pulse 50o, is converted into two output pulses. A first output pulse 50o' is produced as pulse 50o passes through NAND gate 51o and a power amplifier 52o. Pulse 50o' is transmitted through a conductor within cable 30, the connection between contact plug 28a and socket 10d, and conductor 27 to magnetic winding 22. A second pulse 58b is produced as pulse 50o passes through integrating capacitor 54o and pulse shaper 56o. The duration of pulse 58b may be controlled by pulse shaper 56o and is preferably substantially shorter than the duration of control pulse 50o. Pulse shaper 56o further provides a delay such that pulse 58b is generated at a time just shortly after the end of control pulse 50o. Pulse 58b is transmitted through NAND gate 51s and a power amplifier 52s to winding 24 where is appears as a braking pulse 58b'.

Figure 2:
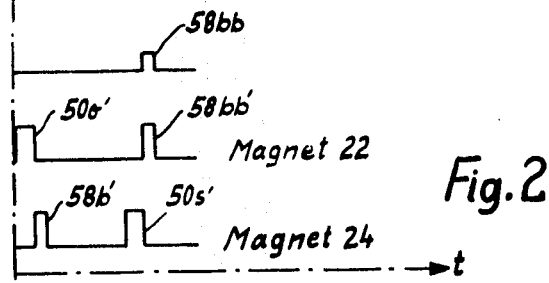
FIG. 2 is a representation of the waveshapes of the voltages appearing at various points in the circuit of FIG. 1.

In a similar manner pulse 50s is converted into a control pulse 50s' and a braking pulse 58bb' (see FIG. 2).

Referring to FIG. 2, the various pulses discussed above are shown on the same time scale in order to facilitate an understanding of the operation of the invention. It will be noted that magnetic winding 22 is first energized by the control pulse 50o' and later is energized by the short braking pulse 58bb' whereas magnetic winding 24 is first energized by the short braking pulse 58b' and thereafter is energized by control pulse 50s'.

Pulse generator 38a, amplifier 48o, power amplifiers 52o, 52s, pulse shapers 48o, 48s and 56o and 56s, and NAND circuits 51o, 51s are conventional and any suitable device for performing the noted functions may be utilized in control device 32. Thus further discussion of the details of construction of these various elements is deemed unnecessary.

It should be noted that the duration of impulses 50o and 50s and pulses 58b and 58bb are generally constant for any one setting of variable resistor 40. However, a variation in the setting of control member 40a will produce a variation in the duration of control pulse 38a and thus in the time interval between the control pulses and, similarly, between the braking pulses. It will be understood that the duration of the control pulses and braking pulses will remain constant and only the interval therebetween will be varied with a variation in the setting of resistor 40.

In operation, the system of the invention functions as follows: Closing of switch 36 in control device 32 by means of a trip mechanism (not shown) produces a signal which is converted in pulse generator 38 into control pulse 38a, the length of which is determined by the setting of variable resistor 40. The leading edge 38o of pulse 38a is converted, as described hereinbefore, into pulse 50o, which passes after appropriate amplification as pulse 50o' to magnetic winding 22 to provide temporary energization thereof. Energization of magnetic winding 22 produces movement of armature 20 from the rest or inoperative position shown to an end position in which armature 20, through linkage mechanism including linkage 18 and double-armed lever 16, causes shutter blades 12 to open. Shortly after the energization of winding 22 by pulse 50o' braking pulse 58 b' is transmitted to winding 24 to cause energization thereof. Under these circumstances, armature 20, which is moving downward to cause opening of shutter blades 12, is exposed to an oppositely acting force produced by magnetic winding 24. This oppositely acting force is effective near the end of the downward movement of armature 20 and provides braking of this movement to prevent a heavy impact of the moving elements of the shutter mechanism against an end stop (not shown) which is provided to limit the travel of these elements. Armature 20 is held by permanent magnet 26 in the end or "open" position thereof until electronic device 32 provides a deactuating pulse.

A deactuating pulse is produced, set forth hereinabove, by converting the trailing edge 38s of control pulse 38a into a rectangular pulse 50s which passes through NAND gate 51s and amplifier 52s to magnetic winding 24 as control pulse 50s'. Temporary energization of the magnetic winding 24 by control pulse 50s' will cause attraction of armature 20 upward and movement thereof from the "open" position to the rest or inoperative position shown in FIG. 1. This movement of armature 20, again through the linkage mechanism including linkage 18 and double-ended lever 16, causes the shutter blades 12 to close. Toward the end of the closing movement of armature 20 and the associated drive linkage for shutter blades 12 pulse 58bb' is transmitted to magnetic winding 22, as described hereinabove, to produce a retarding effect on this movement. The oppositely acting force produced by winding 22 thus reduces the strain and wear on the moving elements of the shutter arrangement.

It should be noted that although the present invention has been described with reference to a system employing first and second magnetic control windings the invention may be incorporated in a system employing a single magnetic winding. Further, the invention could be incorporated in a system employing two magnetic windings one of which serves exclusively as a driving or control winding and one of which serves exclusively as a braking winding. In such an arrangement the control winding could control opening of the shutter blades exclusively with the closing movement of the blades being provided by other means such as a spring, loaded during the opening movement.

It will be understood by those skilled in the art that the embodiment of the invention shown and described herein is subject to various other modifications without departing from the scope and spirit of the invention. Accordingly, it should be understood that the invention is not limited by the exemplary embodiments shown and described but rather only by the subjoined claims as construed in the light of the spirit of the invention.

Having thus described our invention in accordance with the Patent Statutes, We claim:

1. Photographic camera apparatus including a shutter arrangement comprising at least one movable shutter member, pulse-actuated magnetic means for controlling the movement of the shutter member in at least a first direction, and pulse-producing means for controlling actuation of said magnetic means, wherein the improvement comprises magnetic means for producing a retarding force on the movement of the shutter arrangement which acts in a direction opposite to the first direction of movement of the shutter member, said retarding force producing magnetic means comprising further pulse-actuated means for controlling movement of said shutter member in a second direction, and said magnetic means for controlling movement of this shutter member in a first direction being controlled to produce a retarding force on the movement of the shutter member initiated by said further pulse-actuated means.

2. Photographic camera apparatus as claimed in claim 1 wherein the first-mentioned magnetic means comprises a first magnetic winding for controlling the opening movement of said shutter member, said further magnetic means comprises a second magnetic winding for controlling the closing movement of said shutter member, and said first and second pulse-producing means comprises electronic means for producing a first pulse for energizing said first magnetic winding and a second pulse for energizing said second magnetic winding, the interval between said pulses determining the open time of said shutter, said electronic means further comprising means for applying a braking pulse to one of said first and second windings when an energizing pulse is applied to another of said first and second windings.

3. Photographic camera apparatus including a shutter arrangement comprising at least one movable shutter member, a first magnetic winding for driving the shutter member in a first direction for opening said shutter member, a second magnetic winding for driving said shutter member in a second direction for closing said shutter member, pulse-producing electronic means for controlling actuation of said first and second magnetic windings, said electronic means including means for applying a braking pulse to said second winding after a control pulse is applied to said first winding and for applying a braking pulse to said first winding after a control pulse is applied to said second winding.

4. Photographic camera apparatus including a shutter arrangement comprising at least one movable shutter member, a first magnetic winding for driving the shutter member in a first direction for opening said shutter member, a second magnetic winding for driving said shutter member in a second direction for closing said shutter member, pulse-producing electronic means for controlling actuation of said second magnetic winding, said electronic means comprising means for transmitting a control pulse to one of said windings and for transmitting a braking pulse to said one of said windings when said control pulse is applied to said one winding, said braking pulse comprising a delayed version of said control and the duration of said delayed pulse being short as compared with said control pulse.

5. Photographic camera apparatus including a shutter arrangement comprising at least one movable shutter member, a first magnetic winding for driving the shutter member in a first direction for opening said shutter member, first pulse-producing electronic means for controlling actuation of said first magnetic winding, a second magnetic winding for driving said shutter member in a second direction for closing said shutter member, second pulse-producing electronic means for controlling actuation of said second magnetic winding, said first pulse-producing means producing, upon the production of a pulse for initiating movement of said shutter member by said second-pulse producing means, a pulse for actuating said first magnetic means to produce a retarding force on the movement of said shutter member which acts in said first direction and hence retards movement of said shutter member in said second direction.